Patented Nov. 8, 1949

2,487,586

UNITED STATES PATENT OFFICE 2,487,586

PROCESS OF PREPARING 2,4-DIHYDROBENZENESULFONIC ACID

Willard D. Peterson, Easton, Pa., assignor to General Aniline & Film Corporation, New York, N. Y., a corporation of Delaware No Drawing. Application November 28, 1947, Serial No. 788,655

4 Claims. (Cl. 260—512)

1

This invention relates to a process for the sulfonation of 2,4-dihydroxybenzene (resorcinol) and, more particularly, it relates to the production of the mono-sulfonic acid derivative of resorcinol.

The mono-sulfonic acid derivative of resorcinol has been produced by treatment of finely powdered resorcinol with an equimolecular amount of concentrated sulfuric acid (66° Bé.) in the cold. In this process the reaction mixture is dissolved in water and the resulting solution saturated with barium carbonate. It is then decolorized with charcoal and evaporated to dryness in order to obtain the barium salts of resorcinol monosulfonic acid. This process is subject to the disadvantages resulting from the necessity of using concentrated sulfuric acid producing as it does a discoloration which must later be removed by treatment with charcoal. It also involves time-consuming evaporation in order to separate out the salts of the resorcinol mono-sulfonic acid. The sulfonation of resorcinol and related products by reaction with chlorsulfonic acid has been suggested. However, only the disulfonated products or, at best, mixtures of the di-sulfonated and mono-sulfonated derivatives of resorcinol have been obtained by this method. Thus, when chlorsulfonic acid is reacted with resorcinol in the proportion of 2 to 1 in carbon disulfide as a solvent at 0° C. or at room temperature, resorcinol 4,6-disulfonic acid is formed. If equimolecular proportions of the chlorsulfonic acid and resorcinol are reacted in the same solvent, or in chloroform or ether or similar inert diluents for the reactants, a mixture of the disulfonated resorcinol and the monosulfonated resorcinol will be obtained in accordance with the following reactions:

(1) 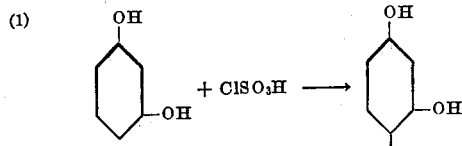

(2) 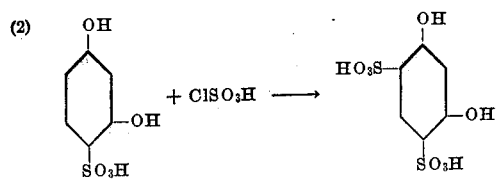

It has now been discovered that the monosulfonic acid derivative of resorcinol, i. e., 2,4-di-

2 hydroxybenzene sulfonic acid can be obtained in pure form by a rather simple process which does not require decolorization, salting out or evaporation in order to recover the pure monosulfonic acid resorcinol. This process consists in reacting the chlorsulfonic acid and resorcinol in the presence of nitro benzene as an inert diluent for the reactants.

The reaction of chlorsulfonic acid and resorcinol, which proceeds in accordance with the foregoing equations, sets up a competition between the resorcinol and the initially formed resorcinol monosulfonic acid for the residual chlorsulfonic acid as long as both resorcinol products are present in the reaction mixture. When the reaction is carried out in the presence of nitro benzene as the diluent, the initially formed monosulfonic acid derivative of resorcinol precipitates out as fast as it is formed due to the insolubility of the monosulfonic acid in nitro benzene. Consequently, although reaction #2 is the stronger of the competing reactions only the monosulfonic acid derivative will be formed as a product since it is precipitated out and removed from the sphere of reaction as fast as it is formed.

This process is carried out by mixing either or both of the reactants with the nitro benzene diluent and adding the one reactant to the solution of the other in the diluent. It has been found most convenient to add a mixture of the chlorsulfonic acid and the diluent to a mixture of resorcinol and the diluent. It is also preferable to react approximately equimolecular amounts of the chlorsulfonic acid and resorcinol. The rate of mixing the reactants appears to have little effect on the production of the monosulfonated product and has no appreciable effect on the yield. The temperature at which the reaction is carried out appears to have only slight effect on the yield and none on the purity of the product. The reaction has been carried out at temperatures ranging from 15° C. to 75° C. without noticeable effect on either the yield or the purity and there appears to be no appreciable difference in the yield or purity of the reaction product whether the temperature is allowed to rise during the reaction or is held at a constant temperature of, for example, 15° C. or 60° C. Except for some change in the yield, the volume of the nitro benzene diluent does not appear to have any effect on the reaction. It has been found that the larger the volume of the diluent the lower the yield of resorcinol monosulfonic acid. On the other hand, sufficient diluent should be used to insure at least partial solution of the resorcinol in order that the reaction with the chlorsulfonic acid should proceed smoothly to form the monosulfonated resorcinol.

The 2,4-dihydroxybenzene sulfonic acid of this process and its salts are useful as intermediates in the preparation of dyestuffs. They are particularly valuable as coupling components for the production of azo dye images in transition diazotype photo-reproduction material.

The preparation of the 2,4-dihydroxybenzene sulfonic acid is illustrated by the following examples in which the parts are by weight unless otherwise specified:

Example I

To a solution of 660 parts of resorcinol in 3320 parts of nitrobenzene at 40 C., are added with stirring 699 parts of chlorosulfonic acid in 415 parts of nitrobenzene in 2–3 minutes, during which time the temperature rises to 60–65° C. Upon cooling to 5° C., a light tan solid of high purity, 2,4-dihydroxybenzene-sulfonic acid, separates in practically quantitative yield.

Example II

To a mixture of 220 parts of resorcinol and 1660 parts of nitrobenzene, 232 parts of chlorosulfonic acid in 415 parts of nitrobenzene are added rapidly with agitation; the temperature being maintained at 15–20° C. by external cooling. A practically quantitative yield of pure 2,4-dihydroxybenzene-sulfonic acid is obtained as a light tan solid.

Example III

To a mixture of 220 parts of resorcinol and 1245 parts of nitrobenzene at room temperature, a mixture of 235 parts $ClSO_3H$ in 415 parts nitrobenzene is slowly added with stirring over a period of 3 hours. The temperature of the reaction rises from room temperature to 40° C. Upon cooling the reaction mixture, 370 parts of light tan, extremely pure 2,4-dihydroxybenzene-sulfonic acid are isolated by filtration.

Having now particularly set forth my invention and having illustrated the best manner in which to perform it, what I claim is:

1. The process of preparing mono-sulfonated resorcinol which comprises reacting chlorsulfonic acid and resorcinol in nitrobenzene and separating the resorcinol mono-sulfonic acid product from the reaction mixture.

2. The process of preparing mono-sulfonated resorcinol which comprises reacting approximately equimolecular amounts of chlorsulfonic acid and resorcinol in nitrobenzene and separating the resorcinol mono-sulfonic acid product from the reaction mixture.

3. The process of preparing mono-sulfonated resorcinol which comprises mixing a solution of chlorsulfonic acid in nitrobenzene and a solution of resorcinol in nitrobenzene while stirring, cooling the reaction mixture and separating the resorcinol mono-sulfonic acid product therefrom.

4. The process of preparing mono-sulfonated resorcinol which comprises adding a solution of chlorsulfonic acid in nitrobenzene to a solution of resorcinol in nitrobenzene while stirring, cooling the reaction mixture and separating out the resorcinol mono-sulfonic acid product by filtration.

WILLARD D. PETERSON.

REFERENCES CITED

The following references are of record in the file of this patent:

UNITED STATES PATENTS

| Number | Name | Date |
|---|---|---|
| 1,452,481 | Baddilz et al. | Apr. 17, 1923 |
| 1,716,082 | Parmalee | June 4, 1929 |